(12) United States Patent  (10) Patent No.: US 12,417,139 B2
Shmaya et al.  (45) Date of Patent: Sep. 16, 2025

(54) ELECTROSTATIC DISCHARGE DETECTION AND DATA STORAGE DEVICE REACTION

(71) Applicant: SANDISK TECHNOLOGIES, INC., Milpitas, CA (US)

(72) Inventors: Shuli Shmaya, Ks (IL); Eran Moshe, Kfar Saba, IL (US)

(73) Assignee: Sandisk Technologies, Inc., Milpitas, CA (US)

( * ) Notice: Subject to any disclaimer, the term of this patent is extended or adjusted under 35 U.S.C. 154(b) by 153 days.

(21) Appl. No.: 18/354,177

(22) Filed: Jul. 18, 2023

(65) Prior Publication Data

US 2025/0028592 A1   Jan. 23, 2025

(51) Int. Cl.
G06F 11/07 (2006.01)
G06F 1/12 (2006.01)

(52) U.S. Cl.
CPC ............ G06F 11/0793 (2013.01); G06F 1/12 (2013.01); G06F 11/0727 (2013.01)

(58) Field of Classification Search
CPC ...... G06F 11/079; G06F 1/12; G06F 11/0727; G06F 11/0793
USPC ............................................................ 714/2
See application file for complete search history.

(56) References Cited

U.S. PATENT DOCUMENTS

| 6,498,524 | B1 | 12/2002 | Kawasaki et al. |
| 6,621,311 | B2 | 9/2003 | Jeon |
| 8,006,121 | B1* | 8/2011 | Samoilova .......... G06F 11/2294 |
| | | | 714/2 |
| 9,135,960 | B2 | 9/2015 | Do |
| 9,250,995 | B2 | 2/2016 | Ellis et al. |
| 9,703,422 | B2 | 7/2017 | Shih et al. |
| 9,847,106 | B1 | 12/2017 | Kim et al. |
| 10,897,132 | B2 | 1/2021 | Tomar et al. |
| 11,561,255 | B2 | 1/2023 | Abhishek et al. |
| 2009/0135663 | A1* | 5/2009 | van Winkelhoff ....... G11C 7/12 |
| | | | 365/189.16 |
| 2013/0070507 | A1* | 3/2013 | Yoon .................... G11C 7/1087 |
| | | | 365/189.011 |

(Continued)

FOREIGN PATENT DOCUMENTS

KR       100408691 B1    4/2004
RU       2156506 C2 *    9/2000 ........... G11C 11/406

OTHER PUBLICATIONS

International Search Report and Written Opinion for Application No. PCT/US2024/030445 dated Sep. 9, 2024.

*Primary Examiner* — Albert Decady
*Assistant Examiner* — Enam Ahmed
(74) *Attorney, Agent, or Firm* — Patterson + Sheridan, LLP

(57) ABSTRACT

Instead of allowing an electrostatic discharge (ESD) event to cause a lost clock signal sync due effects of the ESD event causing an SSD to enter low power mode, utilizing ESD detection can be used to stop the reference clock signal to avoid involuntary low power mode. When an ESD event occurs, an ESD antenna sensor will selectivity disable sensitive signals and the reference clock signal. Once the ESD detector recognizes an ESD event has occurred, the device is able to enter freeze mode. While the reference clock signal is in freeze mode, the input signals are bypassed to avoid lost clock signal sync. Once the ESD event is done, the controller notifies the host to restart the reference clock signal and resume clock signal sync.

18 Claims, 8 Drawing Sheets

(56) References Cited

U.S. PATENT DOCUMENTS

| | | | |
|---|---|---|---|
| 2013/0159611 A1* | 6/2013 | Nasiby | G06F 12/0246 |
| | | | 711/103 |
| 2016/0049203 A1* | 2/2016 | Alrod | G06F 11/073 |
| | | | 714/2 |
| 2018/0166143 A1 | 6/2018 | Chih et al. | |
| 2019/0252005 A1* | 8/2019 | Kim | G11C 5/025 |
| 2023/0098996 A1* | 3/2023 | Tseng | H04B 1/40 |
| | | | 714/39 |

* cited by examiner

ELECTROSTATIC DISCHARGE DETECTION AND DATA STORAGE DEVICE REACTION

BACKGROUND OF THE DISCLOSURE

Field of the Disclosure

Embodiments of the present disclosure generally relate to reducing ground bounce affects through electrostatic discharge (ESD) detection.

Description of the Related Art

Electrostatic discharge (ESD) is a sudden and momentary flow of electric current between two electrically charged objects. When two electrically charged objects, such as the human body and a solid state device (SSD) come into contact with each other, static electricity is discharged. ESD generated from the human body can be of the order of several thousand volts. This high voltage pulse enters the SSD that is touched, resulting in a malfunction or destruction of the IC circuits inside of the SSD.

ESD can be either conducted under the form of a transient voltage or can be radiated due to the ESD's fast-rising time. Powerful harmonics will generate erratic behavior by the application by coupling with other signals. During an ESD event (which has a very high di/dt), there can be unusually large ground bounce in the board/package inductances. Ground bounce is one of the primary causes of false switching. False switching may occur when the ground bounce is enough to cause the input toggle point to shift enough to pass through a guaranteed logic threshold.

False switching has a risk of loss of function of the equipment due to false interrupt or false notification/alarm. Testing shows over sensitivity to ESD, which yield to laptop failure (e.g., blue screen). Following failure analysis, the resistance-capacitance (RC) related to Peripheral Component Interconnect (PCI) Express (PCIe) #CLKREQ sideband signal is found.

Due to ground bounce, the #CLKREQ signal, which is asserted by the SSD, is shown as de-asserted to the host while the #CLKREQ is asserted by the SSD. As a result, the host stops driving PCIe reference clock (REFCLK) and the SSD, which is expected to have an active REFCLK, will enter in to a low power mode. After few nanoseconds (ns), when the phenomena is gone the #CLKREQ signal seen by the host as asserted, and the host will restart toggling REFCLK. Meanwhile, the drive enters lost sync with the host.

Therefore, there is a need in the art for improving detection of an ESD event.

SUMMARY OF THE DISCLOSURE

Instead of allowing an electrostatic discharge (ESD) event to cause a lost clock signal sync due effects of the ESD event causing an SSD to enter low power mode, utilizing ESD detection can be used to stop the reference clock signal to avoid involuntary low power mode. When an ESD event occurs, an ESD antenna sensor will selectivity disable sensitive signals and the reference clock signal. Once the ESD detector recognizes an ESD event has occurred, the device is able to enter freeze mode. While the reference clock signal is in freeze mode, the input signals are bypassed to avoid lost clock signal sync. Once the ESD event is done, the controller notifies the host to restart the reference clock signal and resume clock signal sync.

In one embodiment, a data storage device comprises: a memory device; and a controller coupled to the memory device, wherein the controller is configured to: detect an electrostatic discharge (ESD) event has occurred; disable one or more signals; determine that impacts of the ESD event have sufficiently ended; and re-enable the one or more signals.

In another embodiment, a data storage device comprises: a memory device; and a controller coupled to the memory device, wherein the controller is configured to: detect an electrostatic discharge (ESD) event has occurred; freeze and input clock signal; and resync the input clock signal to a reference clock (REFCLK) signal from a host device.

In another embodiment, a data storage device comprises: means to store data; means to sense an electrostatic discharge (ESD) event has occurred; and a controller coupled to the means to store data and means to sense an ESD event has occurred, wherein the controller is configured to: detect that an ESD event has occurred; and prepare the data storage device to lose a reference clock (REFCLK) signal from a host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of allowing an electrostatic discharge (ESD) event to cause a lost clock signal sync due effects of the ESD event causing an SSD to enter low power mode, utilizing ESD detection can be used to stop the reference clock signal to avoid involuntary low power mode. When an ESD event occurs, a device will selectivity disable sensitive signals and the reference clock signal. Once the ESD detector recognizes an ESD event has occurred, the device is able to enter freeze mode. While the reference clock signal is in freeze mode, the input signals are bypassed to avoid lost clock signal sync. Once the ESD event is done, the controller notifies the host to restart the reference clock signal and resume clock signal sync.

Figure 1:
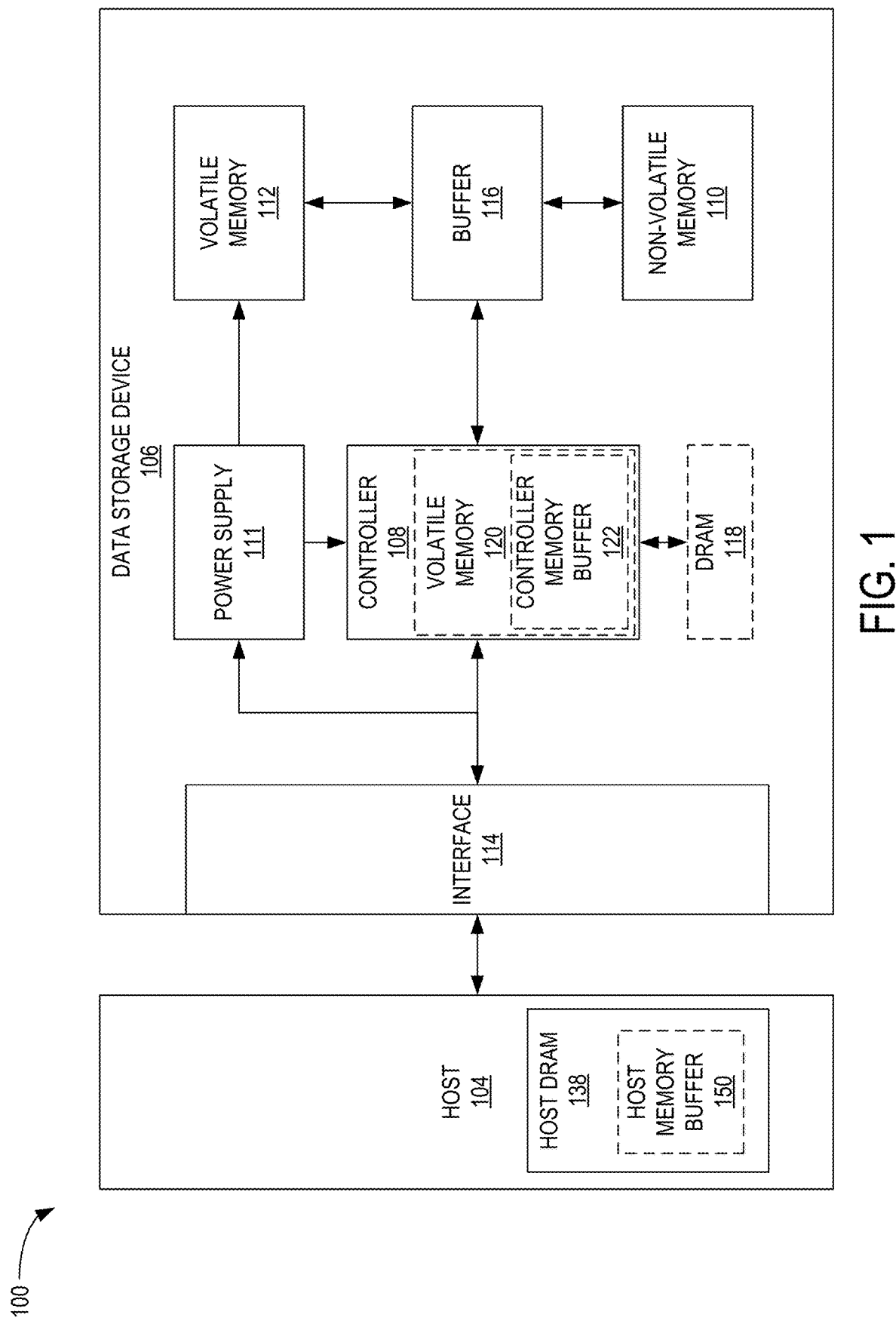
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2A:
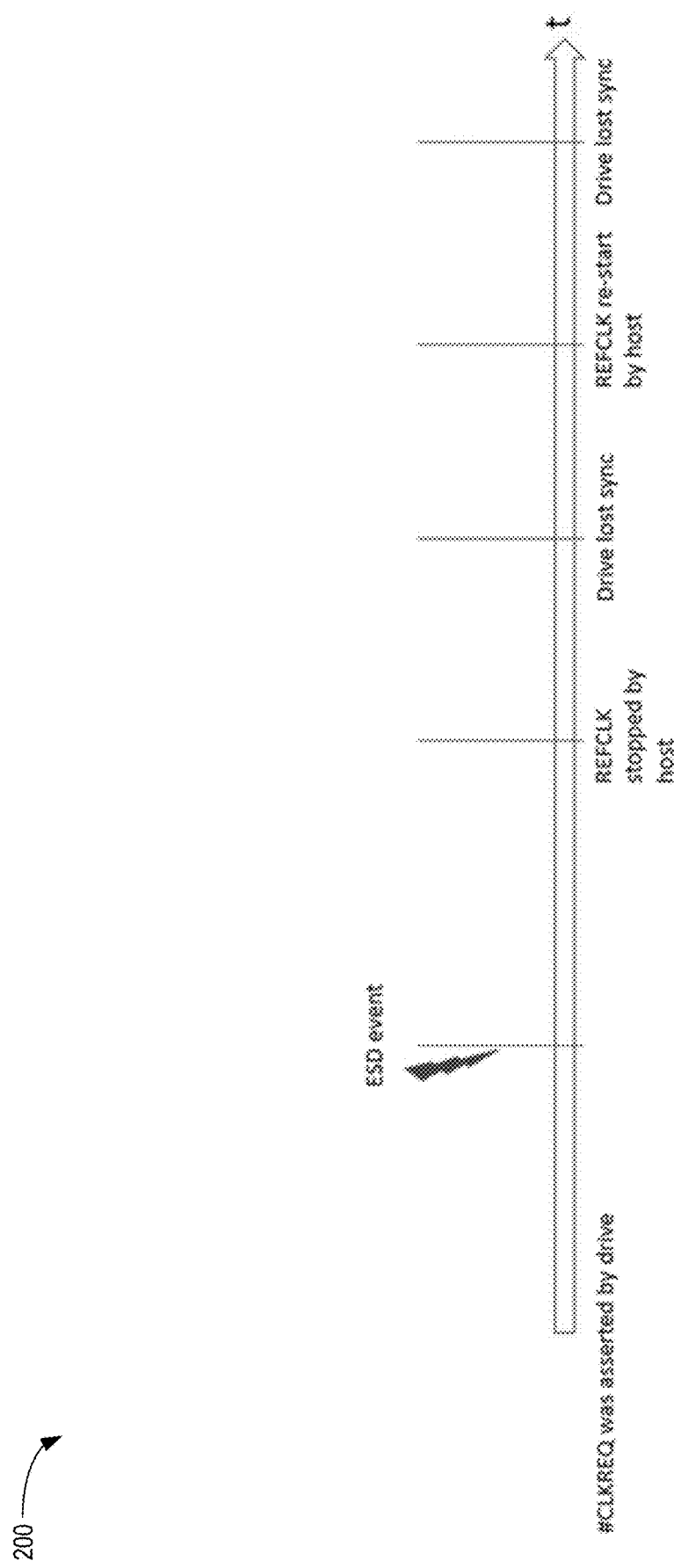
FIG. 2A is a graph illustrating a storage system with no ESD event detection, according to one embodiment.

FIG. 2A is a graph 200 illustrating a storage system with no ESD event detection, according to one embodiment. Without an ESD event detection, a device will be forced into lower mode if an ESD event occurs. ESD events that occur with no detection can lead to false switching, ground bounce, and blue screen for example.

As shown in FIG. 2A, the clock signal (#CLKREQ) is asserted by the SSD. Next there is an ESD event that occurs without any detection. The reference clock signal (REFCLK) is now stopped by the host without any warning or notification due to ground bouncing. The SSD has now lost clock signal (CLK) sync due to the ground bouncing. The ESD event is already behind the sync so the REFCLK is restarted by the host. Since the SSD has already lost the CLK sync, a failure occurs.

Figure 2B:
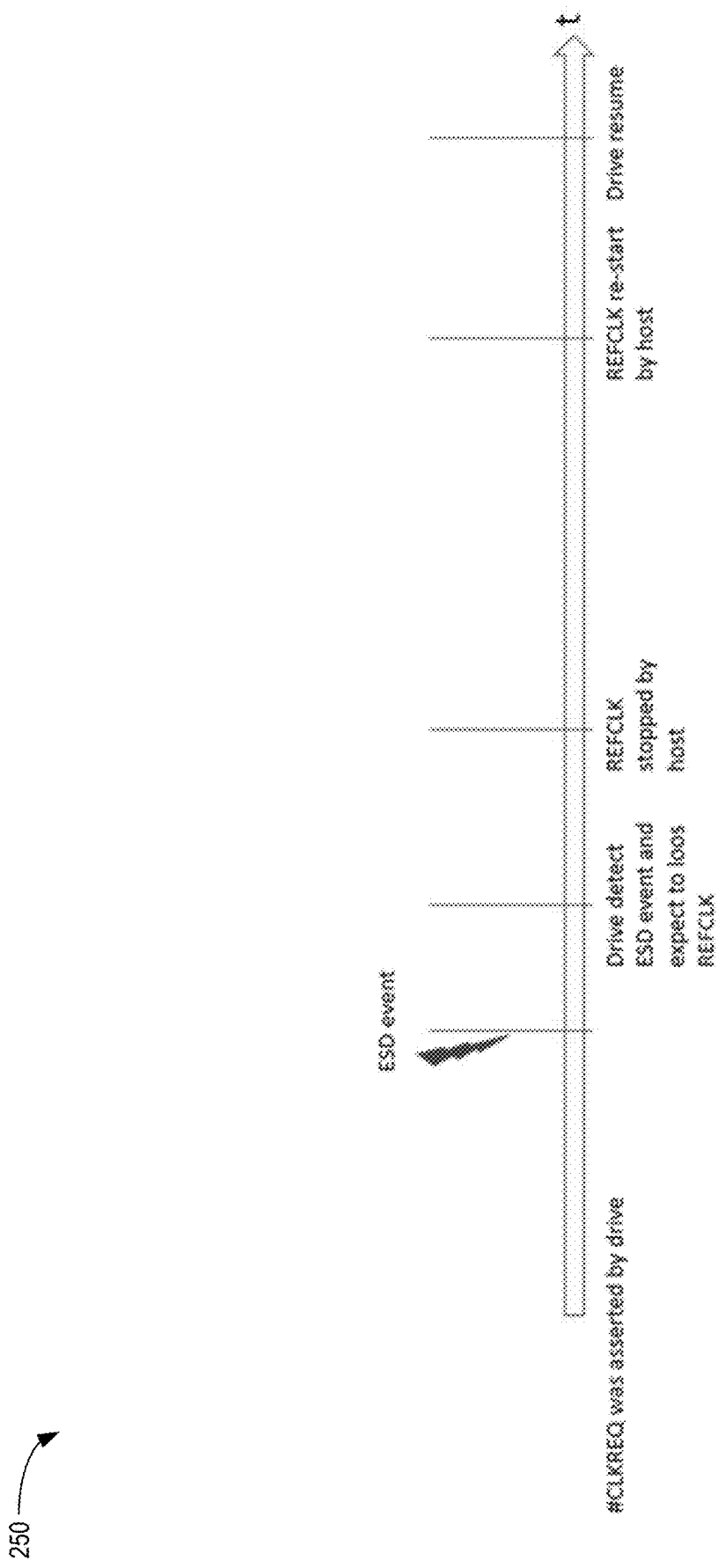
FIG. 2B is a graph illustrating a storage system with ESD event detection, according to one embodiment.

FIG. 2B is a graph 250 illustrating a storage system with ESD event detection, according to one embodiment. With the innovation to detect whether an ESD event is about take place, the SSD is prepared to lose the REFCLK for a predefined interval.

The #CLKREQ is asserted by the SSD. Next there is an ESD event that occurs. The SSD will detect the ESD event and expect to lose the REFCLK. The REFCLK is now stopped by the host. The REFCLK is stopped for the duration of the ESD event. Once the ESD event is complete, the REFCLK is restarted by the host. Since the SSD was prepared for the ESD event, the SSD is able to resume CLK sync.

As will be discussed herein, the embodiments have three components. One component is the ESD sensor which is a physical device that senses an ESD event. Another component is an ESD detector that is a processing unit used to adjust sensor sensitivity and add a time stamp to an ESD event. Another component is a false switching handler that can be implemented as a firmware (FW) module to inform all of the relevant modules that an ESD event has occurred and to treat sensitive signals information accordingly.

Figure 3:
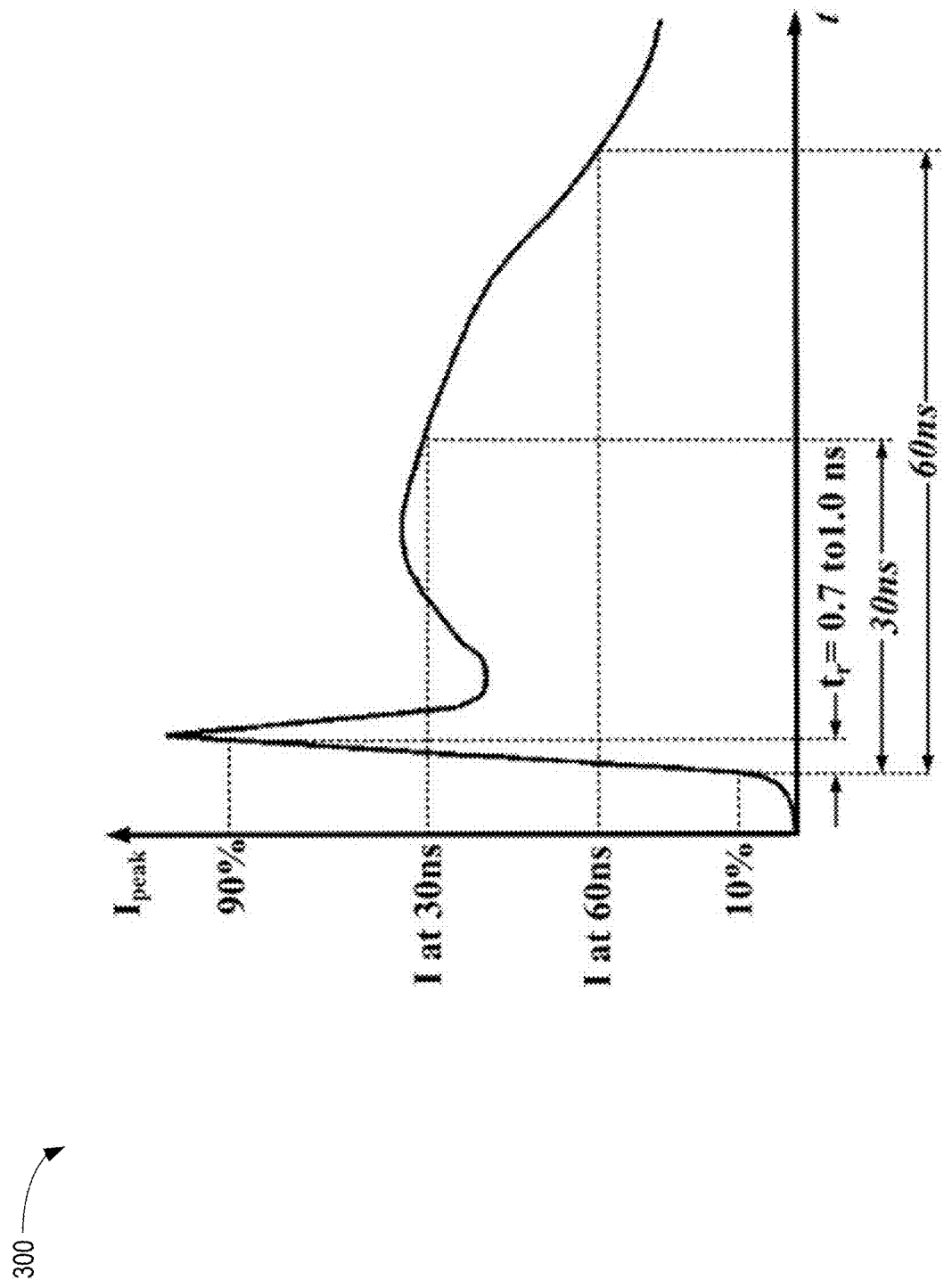
FIG. 3 is a graph illustrating an ESD rise time and current requirements for contact discharge, according to one embodiment.

FIG. 3 is a graph illustrating an ESD rise time and current requirements for contact discharge 300, according to one embodiment. The ESD sensor uses the most common of the commercial standards, International Electrotechnical Commission (IEC) 61000-4-2, which indicates a 0.8 nanosecond (ns) rise time, current at 60 ns, and 30 ns for contact discharge. FIG. 3 illustrates that during an ESD event, the current rises from 10% of the peak to 90% of the peak in about 0.7 ns to about 1.0 ns. After a total of about 30 ns, the current has significantly dissipated, and after 60 ns, the current has again dissipated some more.

Figure 4:
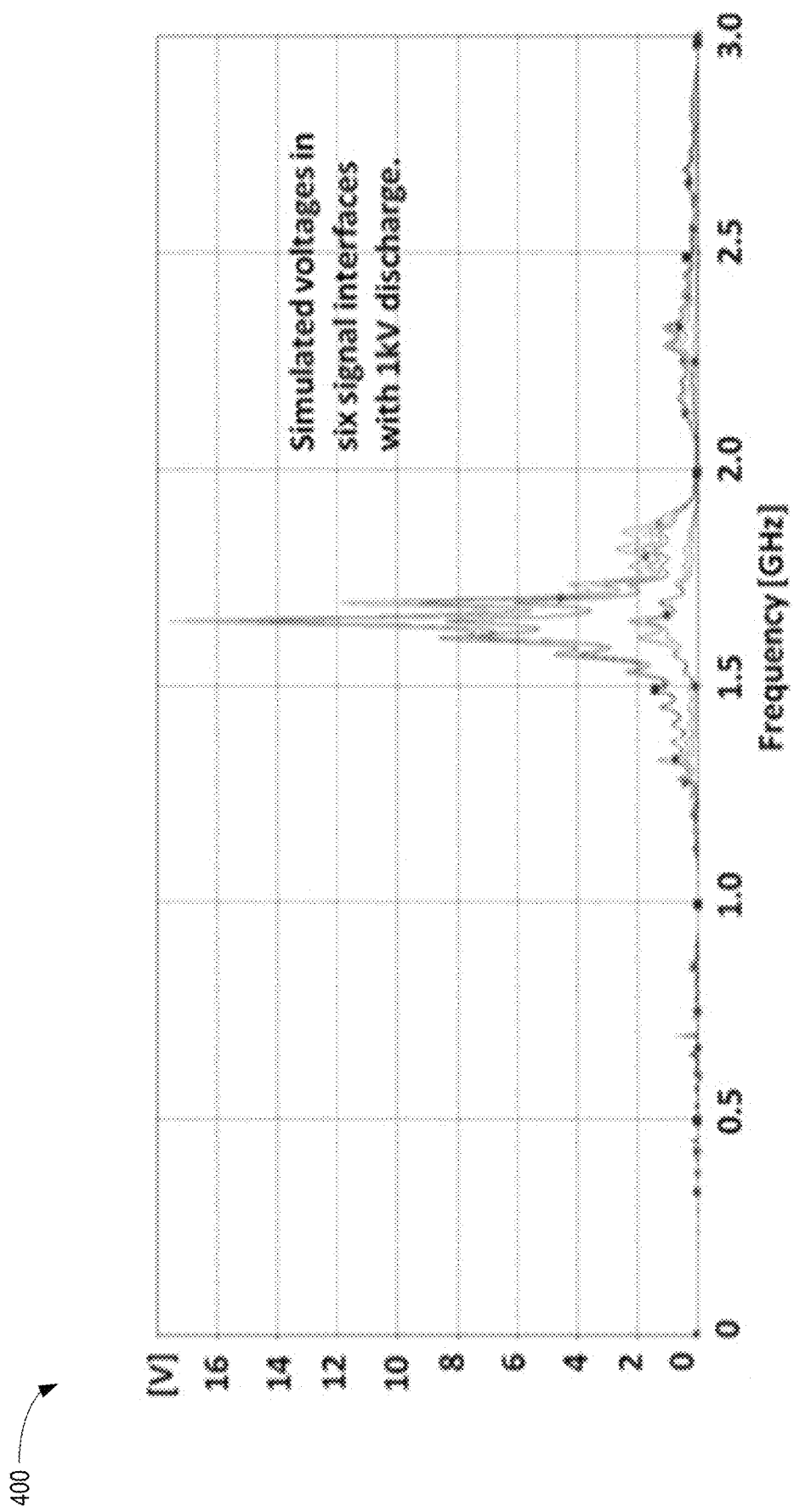
FIG. 4 is a graph illustrating a frequency spectrum of ESD waveforms, according to one embodiment.

FIG. 4 is a graph illustrating a frequency spectrum 400 of ESD waveforms, according to one embodiment. The frequency spectrum 400 is an example of the human body model (HBM) of an ESD event level at a fixed frequency or a fixed time. The frequency spectrum 400 includes simulated voltages in six signal interferences with 1 kV discharge. The frequency spectrum 400 of such an ESD waveform is flat to around 300 MHz and then begins to roll off. Therefore, the ESD event contains significant energy at 1.7 GHZ and above. At the 1.7 GHz can be considered the peak of an ESD event or the current peak of the rise time as shown in FIG. 3.

Figure 5:
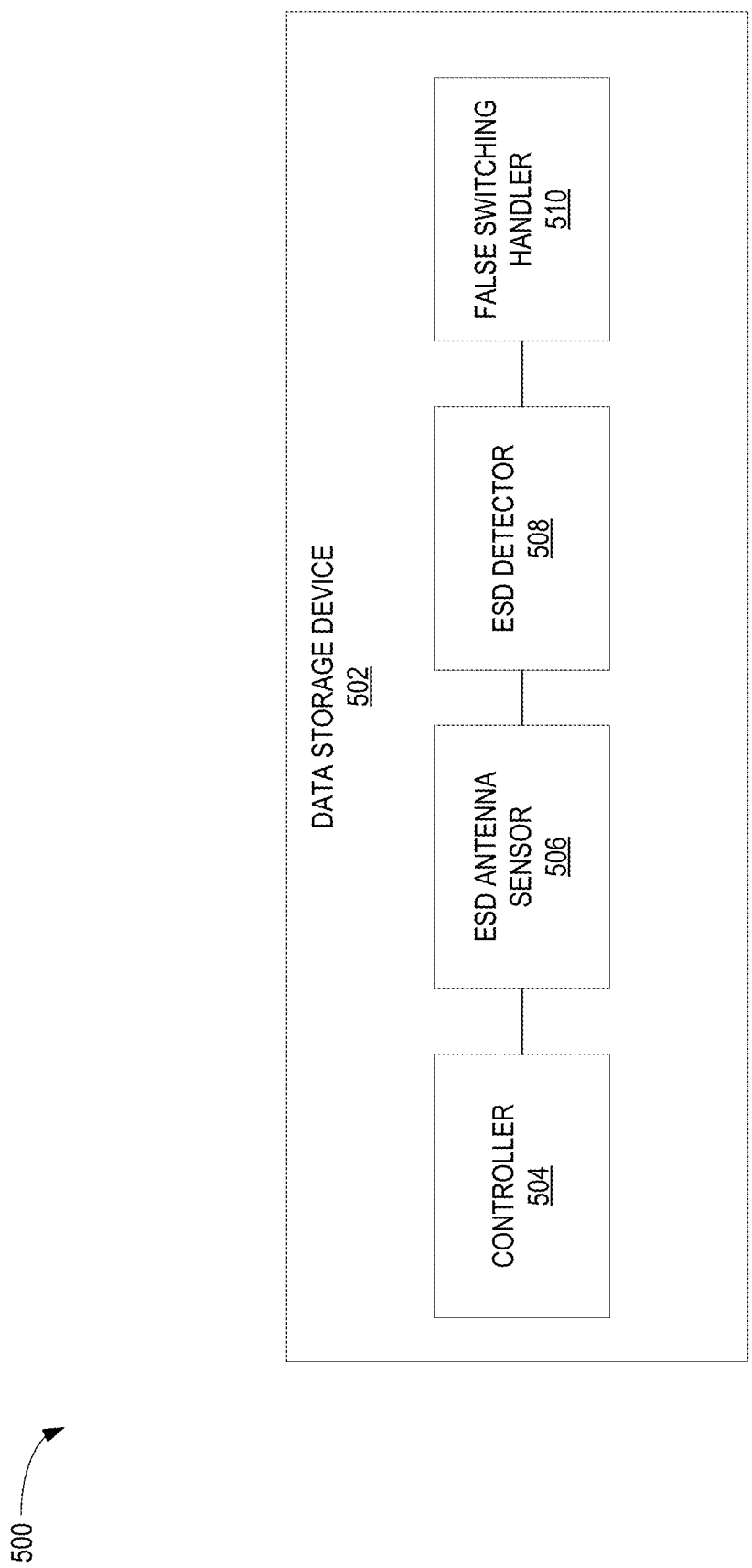
FIG. 5 is a block diagram illustrating a PCB antenna implemented as an ESD sensor, according to certain embodiments.

FIG. 5 is a block diagram illustrating as storage system 500 utilizing a PCB antenna implemented as an ESD sensor, according to certain embodiments. The storage system 500 comprises a data storage device 502, such as data storage device 106 of FIG. 1. The data storage device 502 comprises a controller 504, an ESD sensor 506, ESD detector 508, and a false switching handler 510. The ESD sensor 506 sensor is used to sense an ESD event. The ESD detector 508 is a processing unit enables to adjust sensor sensitivity and add a time stamp for an ESD event. The false switching handler 510 can be implemented as a firmware (FW) module to inform all relevant modules that an ESD event has occurred. The FW will treat sensitive signal information accordingly. The ESD sensor 506 can be implemented as a type of printed circuit board (PCB) antenna comprised of a trace drawn directly onto a PCB. In other embodiments, the ESD sensor 506 can be implemented as a chip antenna or other antenna structures.

The ESD sensor 506 includes processing of the ESD signal by HW or FW that upon detection of the signal by the ESD sensor 506, will selectively disable sensitive signals. When the ESD detector 508 recognizes an ESD event, the storage system 500 can enter in to freeze mode. Freeze mode is when all the input signals are skipped/bypassed and the last state of the device will continue to exist by reducing the modules frequency. When the storage system 500 is in freeze mode, the data storage device 502 is in halt mode. The indication of halt mode will reach all ASIC modules, so all modules will stop processing until the ESD event is done.

Figure 6:
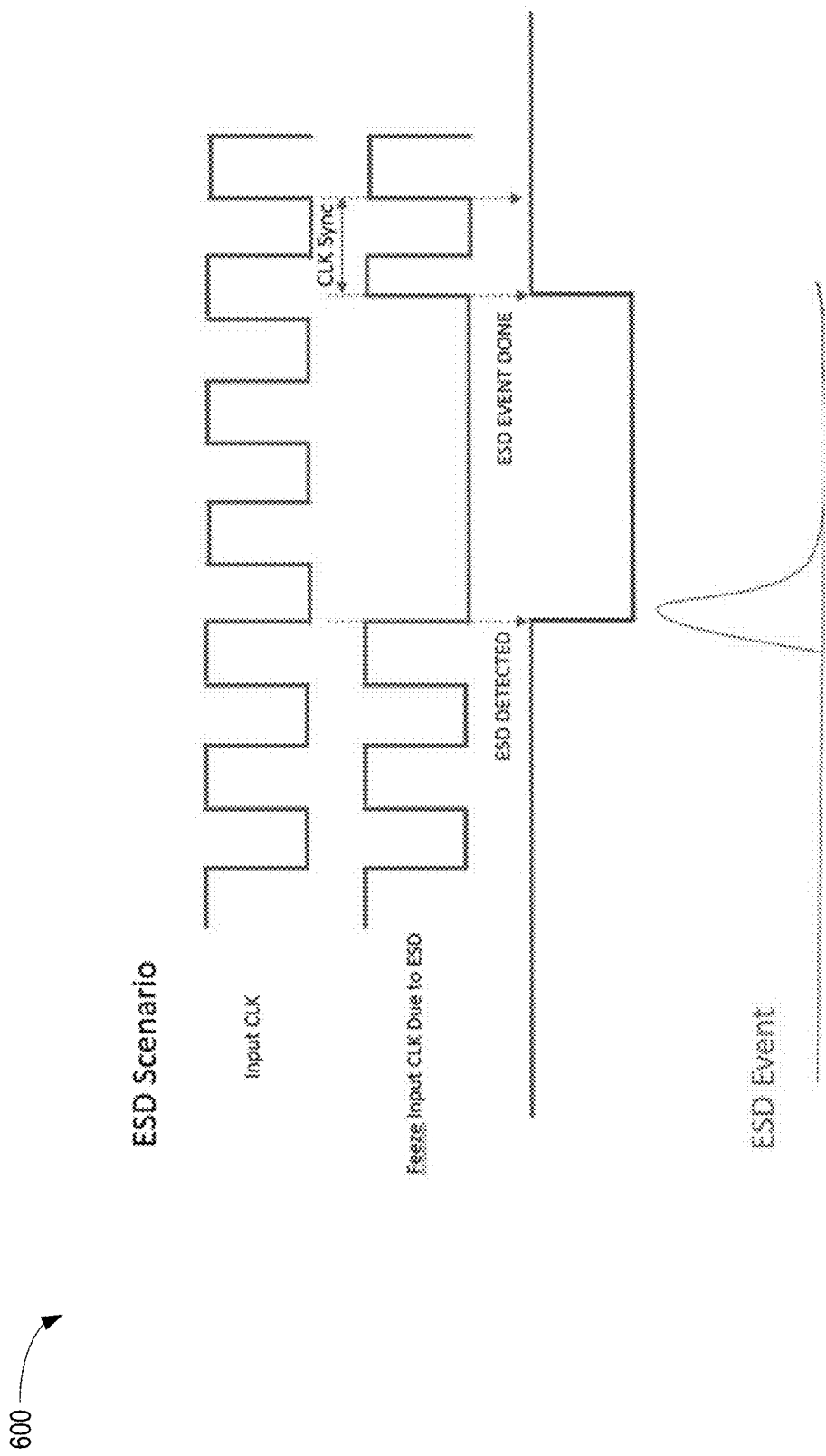
FIG. 6 is a graph illustrating an input signal spectrum utilizing freeze mode, according to one embodiment.

FIG. 6 is a graph illustrating an input signal scenario 600 utilizing freeze mode, according to one embodiment. During the scenario 600, a device, such as the data storage device 402, in freeze mode after detecting an ESD event will push CPU/modules and some no operation (NOPs)/dummy commands to delay the next command's processing for a predetermined time.

More FW response alternatives are to stop fetching commands from the host side or repeating the current write command so the data for next read will be available. When an ESD event occurs during a read command, the device can return to the host corrupted data (UECC/Return zeros instead correct data). The host will request the data again (retransmit), which can be done for low PCIe layers.

When the ESD sensor, such as ESD sensor 506 of FIG. 5, detects an ESD signal, the ESD detector, such as ESD detector 508 of FIG. 5, will recognize the ESD event and enter freeze mode. In freeze mode, all the input signals can be stopped or can bypass the input signals. The ESD sensor is able to accept signals until the ESD event is done. After the ESD event finishes, the input signals and REFCLK can return to regular operation.

The ESD sensor is able to sense a specific frequency, which is the frequency of the device. At the specific frequency, when there is a discharge for the ESD event, there will be a surge or high voltage. The device is tuned to the frequency peak shown in FIG. 4. The ESD detector can detect ESD events by, but not limited to periods, frequencies, thresholds, interrupts, and notifications.

Figure 7:
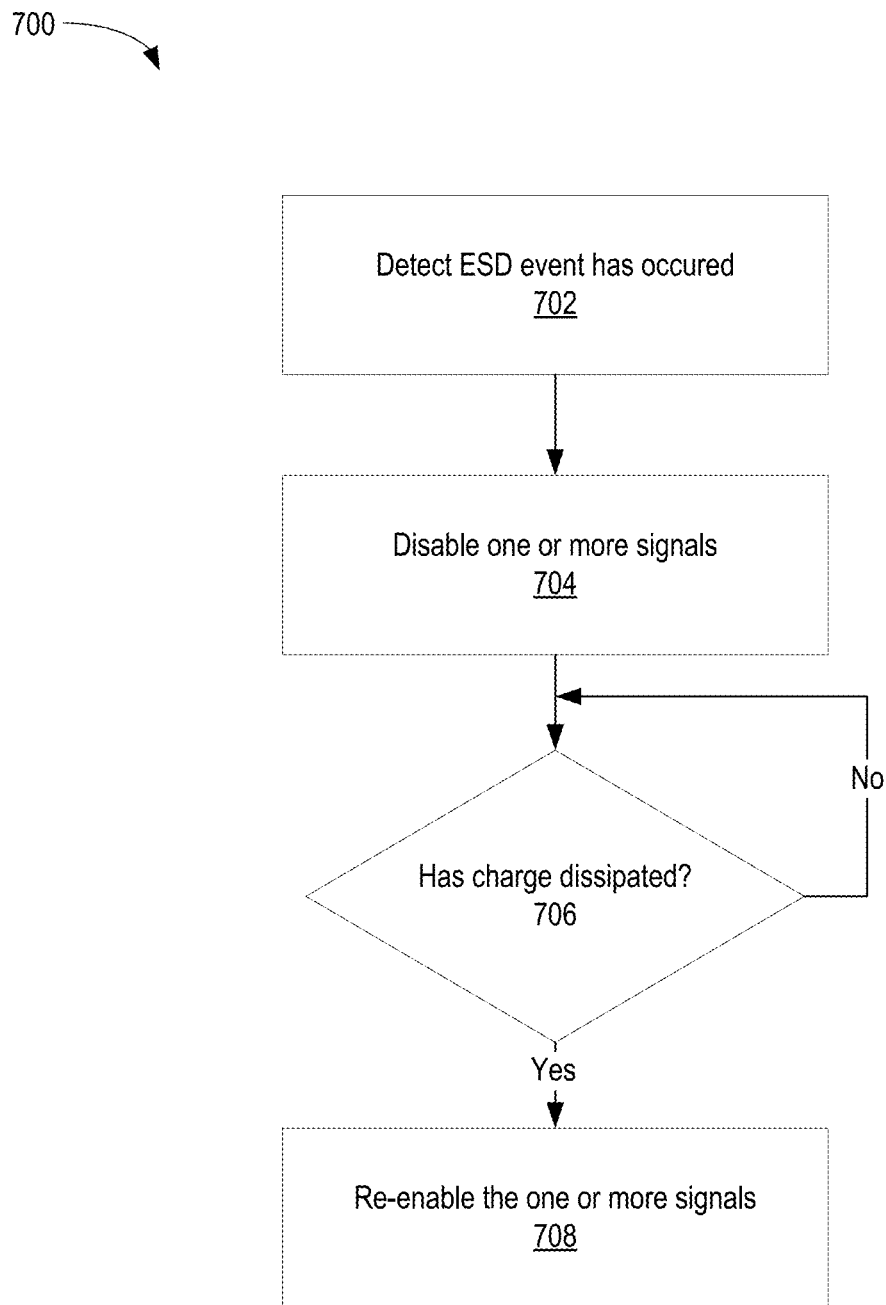
FIG. 7 is a flowchart illustrating a method for ESD detection, according to certain embodiments.

FIG. 7 is a flowchart illustrating a method 700 for ESD detection, according to certain embodiments. The 700 begins at block 702. At block 702, an ESD detector, such as ESD detector 508 of FIG. 5, detects that an ESD event has occurred. At block 704, the host, such as the host 104 of FIG. 1, will be notified by the controller, such as controller 504 of FIG. 5, to disable the one or more signals. At block 706, the controller determines whether the charge of the ESD event has dissipated. If the controller determines that the charge has not dissipated, then the method 700 repeats block 706 by waiting for the charge to dissipate. If the controller determines that the charge has dissipated, then the method 700 proceeds to block 708. At block 708, the controller notifies the host to re-enable the one or more signals.

The advantages of utilizing ESD detection in devices is to avoid blue screen situations. ESD detection will allow a device to increase performance by not losing CLK sync do to an unexpected ESD event from ground bouncing. Thus, improved ESD system robustness is achieved.

In one embodiment, a data storage device comprises: a memory device; and a controller coupled to the memory device, wherein the controller is configured to: detect an electrostatic discharge (ESD) event has occurred; disable one or more signals; determine that impacts of the ESD event have sufficiently ended; and re-enable the one or more signals. The determining comprises determining that a predetermined period of time has passed since the detecting. The predetermined period of time is less than a period of time necessary current of the ESD event to dissipate. The predetermined period of time is dynamic. The predetermined period of time is less than 60 ns. The determining comprises determining that a current from the ESD event has reduced to a predetermined level. The predetermined level is less than 90% of a current peak of the ESD event and greater than 10% of the current peak of the ESD event. The detecting comprises detecting a current spike at a predetermined frequency has occurred. The predetermined frequency is between about 1.5 GHZ and about 1.8 GHz. The controller is configured to resync with the re-enabled one or more signals.

In another embodiment, a data storage device comprises: a memory device; and a controller coupled to the memory device, wherein the controller is configured to: detect an electrostatic discharge (ESD) event has occurred; freeze and input clock signal; and resync the input clock signal to a reference clock (REFCLK) signal from a host device. The freezing comprises skipping or bypassing all input signals to the data storage device. After the freezing and prior to the resyncing, a last state of the data storage device continues, wherein the last state continuation occurs by reducing module frequency of the data storage device. After the freezing and prior to the resyncing, corrupted data associated with read commands are returned to the host device. After the freezing and prior to the resyncing, dummy commands are pushed into a command pipeline to delay processing of non-dummy commands. After the freezing and prior to the resyncing, commands are not fetched for processing. After the freezing and prior to the resyncing, write commands are repeated.

In another embodiment, a data storage device comprises: means to store data; means to sense an electrostatic discharge (ESD) event has occurred; and a controller coupled to the means to store data and means to sense an ESD event has occurred, wherein the controller is configured to: detect that an ESD event has occurred; and prepare the data storage device to lose a reference clock (REFCLK) signal from a host device. The controller is configured to prepare to receive the REFCLK signal after current from the ESD event has dissipated. The controller is configured to add a time stamp to tracking of the ESD event.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
    detect an electrostatic discharge (ESD) event has occurred;
    disable one or more signals;
    determine that impacts of the ESD event have sufficiently ended, wherein the determining comprises determining that a current from the ESD event has reduced to a predetermined level, wherein the predetermined level is less than 90% of a current peak of the ESD event and greater than 10% of the current peak of the ESD event; and
    re-enable the one or more signals.

2. The data storage device of claim 1, wherein the determining comprises determining that a predetermined period of time has passed since the detecting.

3. The data storage device of claim 2, wherein the predetermined period of time is less than a period of time necessary for the ESD event to dissipate.

4. The data storage device of claim 2, wherein the predetermined period of time is dynamic.

5. The data storage device of claim 2, wherein the predetermined period of time is less than 60 ns.

6. The data storage device of claim 1, wherein the detecting comprises detecting a current spike at a predetermined frequency has occurred.

7. The data storage device of claim 6, wherein the predetermined frequency is between about 1.5 GHZ and about 1.8 GHz.

8. The data storage device of claim 1, wherein the controller is configured to resync with the re-enabled one or more signals.

9. A data storage device, comprising:
a memory device; and
a controller coupled to the memory device, wherein the controller is configured to:
    detect an electrostatic discharge (ESD) event has occurred;
    freeze and input clock signal;
    determine that impacts of the ESD event have sufficiently ended, wherein the determining comprises determining that a current from the ESD event has reduced to a predetermined level, wherein the predetermined level is less than 90% of a current peak of the ESD event and greater than 10% of the current peak of the ESD event; and
    resync the input clock signal to a reference clock (REFCLK) signal from a host device.

10. The data storage device of claim 9, wherein the freezing comprises skipping or bypassing all input signals to the data storage device.

11. The data storage device of claim 9, wherein after the freezing and prior to the resyncing, a last state of the data storage device continues, wherein the last state continuation occurs by reducing module frequency of the data storage device.

12. The data storage device of claim 9, after the freezing and prior to the resyncing, corrupted data associated with read commands are returned to the host device.

13. The data storage device of claim 9, wherein after the freezing and prior to the resyncing, dummy commands are pushed into a command pipeline to delay processing of non-dummy commands.

14. The data storage device of claim 9, after the freezing and prior to the resyncing, commands are not fetched for processing.

15. The data storage device of claim 9, after the freezing and prior to the resyncing, write commands are repeated.

16. A data storage device, comprising:
means to store data;
means to sense an electrostatic discharge (ESD) event has occurred; and
a controller coupled to the means to store data and means to sense an ESD event has occurred, wherein the controller is configured to:
    detect that an ESD event has occurred
    determine that impacts of the ESD event have sufficiently ended, wherein the determining comprises determining that a current from the ESD event has reduced to a predetermined level, wherein the predetermined level is less than 90% of a current peak of the ESD event and greater than 10% of the current peak of the ESD event; and
    prepare the data storage device to lose a reference clock (REFCLK) signal from a host device.

17. The data storage device of claim 16, wherein the controller is configured to prepare to receive the REFCLK signal after current from the ESD event has dissipated.

18. The data storage device of claim 16, wherein the controller is configured to add a time stamp to tracking of the ESD event.

* * * * *